United States Patent
O'Gorman et al.

(10) Patent No.: US 11,810,457 B2
(45) Date of Patent: Nov. 7, 2023

(54) SYSTEMS AND METHODS FOR LOCATING A PARKING SPACE

(71) Applicant: Ford Global Technologies, LLC, Dearborn, MI (US)

(72) Inventors: Ryan O'Gorman, Beverly Hills, MI (US); Harrison Wood, Dearborn, MI (US); Farshad Harirchi, Ann Arbor, MI (US); Devang Davé, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 17/324,862

(22) Filed: May 19, 2021

(65) Prior Publication Data
US 2022/0375347 A1 Nov. 24, 2022

(51) Int. Cl.
*G08G 1/14* (2006.01)
*H04W 4/02* (2018.01)
*H04W 4/021* (2018.01)
*H04W 4/46* (2018.01)

(52) U.S. Cl.
CPC ............ *G08G 1/143* (2013.01); *H04W 4/021* (2013.01); *H04W 4/026* (2013.01); *H04W 4/46* (2018.02)

(58) Field of Classification Search
CPC .......... G08G 1/14; G08G 1/141; G08G 1/142; G08G 1/143; G08G 1/144; G08G 1/146; G08G 1/147; G08G 1/148; H04W 4/021; H04W 4/026; H04W 4/46; G01C 21/3685; G07B 15/02
See application file for complete search history.

(56) References Cited

U.S. PATENT DOCUMENTS

| | | | |
|---|---|---|---|
| 9,747,797 B1 | 8/2017 | Ghosh et al. | |
| 10,446,028 B2 | 10/2019 | Agrawal et al. | |
| 2012/0056758 A1 | 3/2012 | Kuhlman et al. | |
| 2012/0200430 A1 | 8/2012 | Spahl | |
| 2018/0283894 A1* | 10/2018 | Alneghaimish | G08G 1/04 |
| 2018/0335777 A1* | 11/2018 | Gibbs | G05D 1/0297 |
| 2019/0009713 A1* | 1/2019 | Pal | B60Q 1/48 |
| 2019/0088127 A1* | 3/2019 | Bostick | G08G 1/144 |
| 2019/0362630 A1 | 11/2019 | Guseynov et al. | |

(Continued)

FOREIGN PATENT DOCUMENTS

WO 2018072597 A1 4/2018

OTHER PUBLICATIONS

Z. Zhao "A Comparative Study of Parking Occupancy Prediction Methods Considering Parking Type and Parking Scale" (Feb. 2020).

(Continued)

*Primary Examiner* — Orlando Bousono
(74) *Attorney, Agent, or Firm* — Brandon Hicks; Eversheds Sutherland (US) LLP (57) ABSTRACT

The disclosure describes systems and methods that are configured to measure and generate parking environment data including locations of parking spaces and their occupancy status, and to use the parking environment data to find an unoccupied parking space for a vehicle. In particular, a system is configured to determine the location and occupancy status of parking spaces based on parking environment data received from a vehicle, and to determine a location of an unoccupied parking space based on a database of parking environment data.

10 Claims, 3 Drawing Sheets

(56) References Cited

U.S. PATENT DOCUMENTS

2020/0302790 A1* 9/2020 Humphreys ........... G08G 1/143
2022/0374639 A1* 11/2022 Nakagawa ........... G06V 20/586

OTHER PUBLICATIONS

E. I. Vlahogianni "A Real-Time Parking Prediction System for Smart Cities" (Apr. 2015).
C. Badii et al. "Predicting Available Parking Slots on Critical and Regular Services by Exploiting a Range of Open Data" (Aug. 2018).

* cited by examiner

SYSTEMS AND METHODS FOR LOCATING A PARKING SPACE

BACKGROUND

In many places, such as major cities, public street parking may be difficult to find. Drivers may have to circle a location for an extended period of time until a parking space opens up. Lack of parking can lead to double parking, illegal parking, and hindering traffic through constant circling. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to measure and generate parking environment data including locations of parking spaces and their occupancy status, and to use the parking environment data to find an unoccupied parking space for a vehicle. In particular, a system is configured to determine the location and occupancy status of parking spaces based on parking environment data received from a vehicle, and to determine a location of an unoccupied parking space based on a database of parking environment data.

Figure 1:
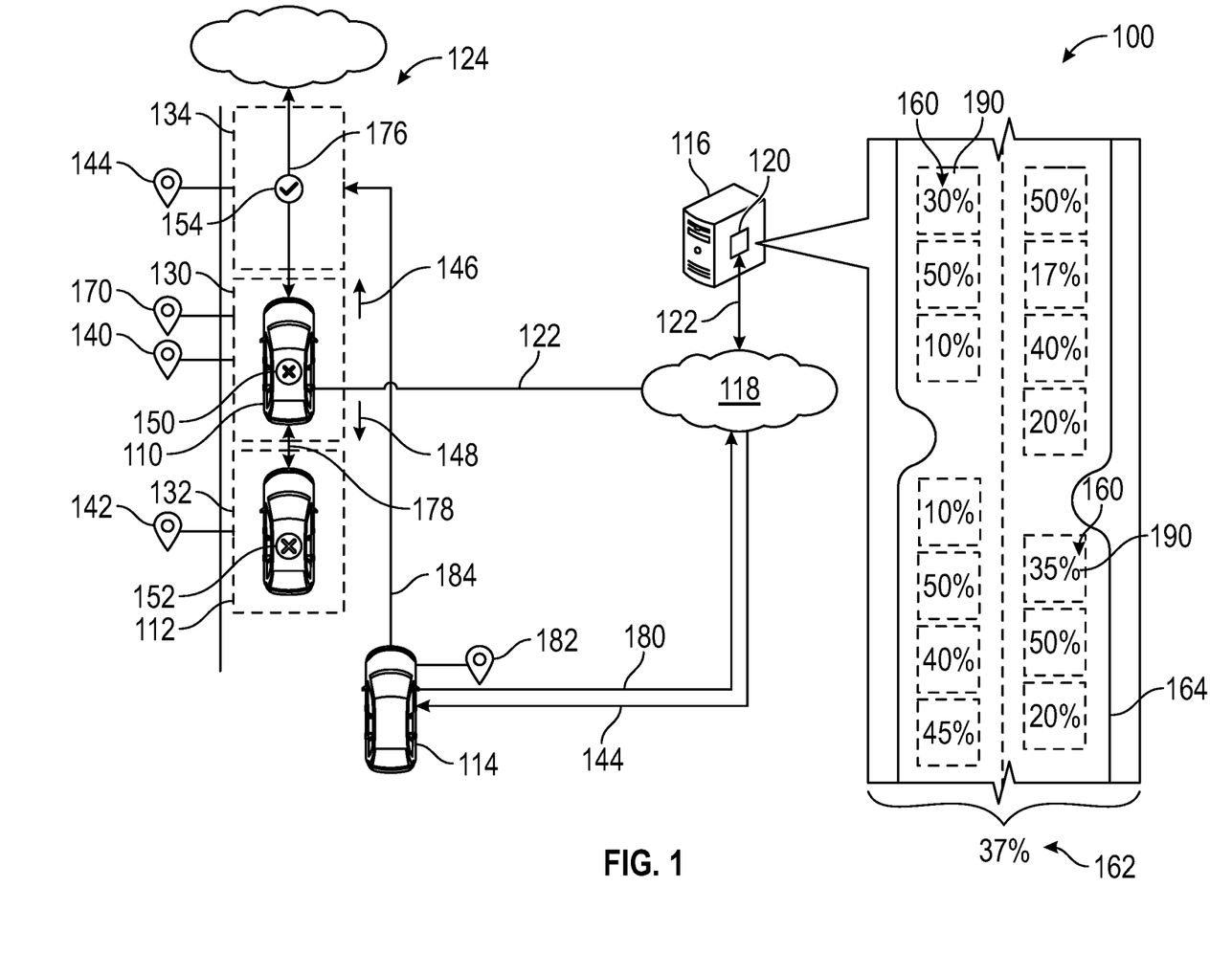
FIG. 1 depicts a system including a vehicle in a parking environment in accordance with the present disclosure.

Referring to FIG. 1, a system 100 includes a plurality of vehicles 110, 112, 114 and a server 116 that are connected by a network 118. The server 116 includes a database 120 of parking environment data 122.

In FIG. 1, a parking environment 124 or area includes a plurality of parking spaces 130, 132, 134. Each parking space 130, 132, 134 has a respective location 140, 142, 144. In this example, the location 144 of the parking space 134 is at a distance (e.g., a length of a parking space) in a forward direction 146 from the location 140 of the parking space 130; and the location 142 of the parking space 132 at a distance (e.g., at a length of a parking space) in a reverse direction 148 from the location 140 of the parking space 130.

The parking environment data 122 represents the parking environment 124 (e.g., represented as an area 164 of a digital map) including the locations 140, 142, 144 of parking spaces 130, 132, 134, the occupancy status 150, 152, 154 (e.g., "X" symbol 150, 152 represents an occupied status and "checkmark" symbol 154 represents an unoccupied status) of parking spaces 130, 132, 134, a time associated with the occupancy status 150, 152, 154, a predicted availability 160 of parking spaces 190 (e.g., a percentage of time that a parking space is unoccupied during a part of the day based on historical occupancy status of the parking spaces), a predicted availability 162 for the area 164, and the like.

The database 120 may identify parking spaces as handicapped, charging spots, economy size, large vehicle, and the like. The database 120 may also include objects (e.g., trailers, generators, storage containers, etc.) that are permanent or not predicted to move and the locations of such objects.

The server 116 is configured to receive parking environment data 122 from one or more vehicles (e.g., the vehicle 110 as shown in FIG. 1), to generate additional parking environment data 122, and to update the database 120 based on the parking environment data 122.

For example, in FIG. 1, the vehicle 110 is parked in the parking space 130. In other instances, the vehicle 110 may be driving down the street. The vehicle 110 may determine its location 170 and send the location 170 to the server 116 via the network 118.

The server 116 may determine, based on the location 170, that the vehicle 110 is occupying parking space 130 and update the database 120 for the parking space 130 (e.g., change the occupancy status 150 to "occupied") including the time of the update. For example, the location 170 is compared to the locations 140, 142, 144 and the parking space 130 is identified where the smallest difference is found between location 170 and location 140.

The vehicle 110 may determine a distance 176, 178 to an object or obstruction in each of the forward direction 146 and the reverse direction 148. In FIG. 1, the distance 176 to an object extends beyond the parking space 134 and the distance 178 is to the vehicle 112 that is in the parking space 132.

The vehicle 110 may also measure the motion of a vehicle 112 in an adjacent parking space and notify the server 116 that the vehicle 112 is about to leave.

The vehicle 110 may send the distances 176, 178 and directions 146, 148 relative to its location 170 to the server 116. The server 116 may determine the occupancy status 152, 154 of parking spaces 132, 134 based on the distances 176, 178 and directions 146, 148 relative to the location 170.

The server 116 may determine parking spaces 132, 134 that are adjacent to the location 170 based on the locations 142, 144 of the parking spaces 132, 134 and the location 170. For example, location 144 is closest to the location 170 in the forward direction 146 and location 142 is closest to the location 170 in the reverse direction 148.

For each direction 146, 148, the associated distance 176, 178 indicates if and how many spaces are unoccupied in that direction. For example, server 116 determines that the parking space 134 is unoccupied because forward distance 176 in the forward direction 146 is greater than a length of the parking space 134; and the server 116 updates the occupancy status 154 to reflect that parking space 134 is unoccupied. The server 116 determines that the parking space 132 is occupied because reverse distance 178 in the reverse direction 148 is less than a length of the parking space 132; and the server 116 updates the occupancy status 152 to reflect that the parking space 132 is occupied.

Accordingly, the server 116 includes a database 120 of parking environment data 122 that can be used to facilitate locating an unoccupied parking space, or parking spaces or areas 164 where parking spaces have a higher probability of being unoccupied.

In FIG. 1, vehicle 114 sends a request 180 to the server 116 to find an unoccupied parking space. The request 180 may include a destination location or a location 182 of the vehicle 114, each of which may represent a location or area where the vehicle 114 wants to park. For purposes of teaching, vehicle location 182 will be used to further describe an exemplary method.

Based on the request 180, the server 116 may determine an unoccupied parking space in a parking environment 124 (e.g., a designated area 164) that includes the vehicle location 182. The parking environment 124 or area 164 may be a predefined area or may be determined according to a threshold distance from the vehicle location 182.

The parking spaces in the parking environment 124 provide an initial set of parking spaces 130, 132, 134. In the case of a threshold distance from the vehicle location 182, the server 116 may compare the vehicle location 182 to the locations 140, 142, 144 of parking spaces 130, 132, 134 to determine an initial set of parking spaces.

The server 116 may then determine which of the set of parking spaces 130, 132, 134 have an occupancy status 150, 152, 154 that is unoccupied. In FIG. 1, the server 116 may select the parking space 134 as that which is closest to the vehicle location 182 and which has an occupancy status 154 that is unoccupied. The server 116 may provide the location 144 of the parking space 134 to the vehicle 114, which may then generate directions 184 to the location 144 of the parking space 134.

More generally, the server 116 may generate a set or list of unoccupied parking spaces in an area or ranked according to shortest distance to the vehicle location 182 and provide the location of the closest unoccupied parking space. The server 116 may update the list of unoccupied parking spaces (e.g., add or remove parking spaces) as the status of the parking spaces change over time (e.g., before the vehicle 114 arrives at the parking space 134). The server 116 may provide a next best parking space until the vehicle is parked in an unoccupied space.

Alternatively, the vehicle 114 may display locations of unoccupied parking spaces on a digital map (e.g., as is represented by area 164) that is provided on a display of the vehicle 114. For example, the server 116 may provide an area that includes a high density of unoccupied parking spaces. The server 116 may update the map (e.g., add or remove highlighting from areas or individual parking spaces) as the status of the parking spaces change over time.

For each parking space, the occupancy status 150, 152, 154 is tracked over time and the server 116 calculates a predicted availability 160 for each parking space. A predicted availability 160 may be calculated for each day of the week and for time increments during each day. For example, the predicted availability 160 for parking space 130 at Wednesday from 1 pm to 1:30 pm may use the historical occupancy status 150 as measured on Wednesdays at times in the time period of 1 pm to 1:30 pm. As shown for spaces in area 164, the predicted availability 160 may be presented as a percentage of time that the parking space is unoccupied.

The predicted availability 160 may also be based a frequency of change in occupancy status 150, 152, 154.

If the occupancy status 150, 152, 154 of a parking space is unknown, the server 116 may use the predicted availability 160 to facilitate finding an unoccupied parking space. For example, the occupancy status of a parking space may be unknown if recent measurements are not available.

The vehicle 114 may display the locations of parking spaces 190 and their predicted availability 160 on a digital map (e.g., as shown for area 164) that is provided on a display of the vehicle 114. FIG. 1 schematically illustrates the database 120 as including predicted availability 160 for parking spaces 190 in an area 164 (e.g., a street). Parking spaces 190 with a predicted availability 160 above a certain threshold (e.g., 50%) may be highlighted.

The server 116 may also use the predicted availability 160 of parking spaces 190 to determine a predicted availability 162 for an area 164. For example, the predicted availability 162 for the area 164 may be the average of the predicted availability 160 of the parking spaces 190 in the area 164. Additionally or alternatively, if a certain number of spaces have a predicted availability 160 that is above a certain threshold, the predicted availability 162 in an area may be represented by a density of such spaces for the area.

If the predicted availability 162 is above a certain threshold, the area 164 may be highlighted on a map or represented by a numerical value. This feature facilitates comparing areas and discovering areas where parking is available.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 2:
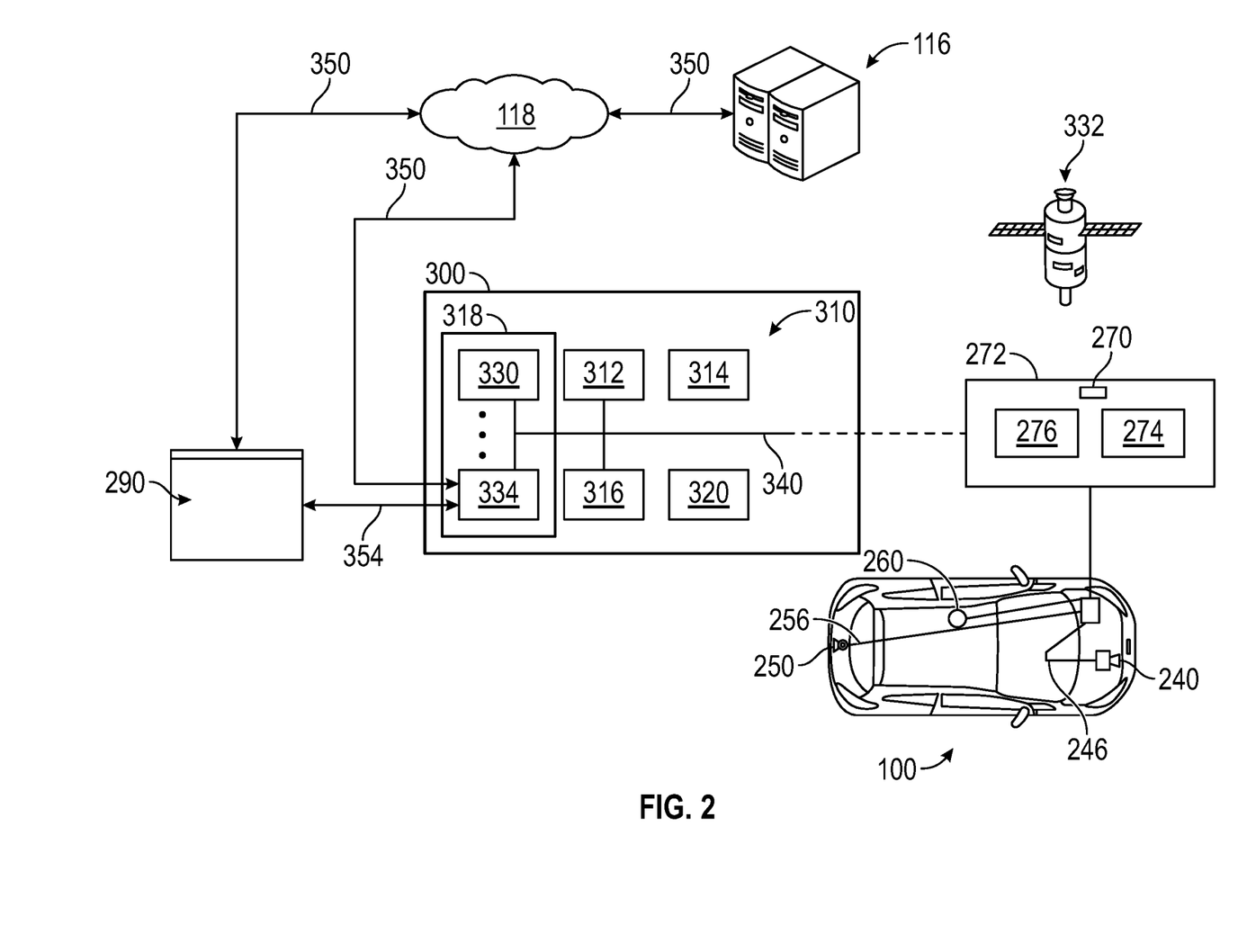
FIG. 2 depicts the system of FIG. 1 including vehicle systems in accordance with the present disclosure.

Referring to FIGS. 1 and 2, the system 100 is described in greater detail. The system 100 includes a plurality of vehicles 110, 112, 114 and the server 116.

For purposes of teaching, vehicle 110 is described in further detail. However, the descriptions of vehicle 110 is applicable to the other of the plurality of vehicles.

The vehicle 110 may take the form of a passenger or commercial automobile such as, for example, a car, a truck, a sport utility, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as, a transmission, a drive shaft, a differential, etc.

In another configuration, the vehicle 110 may be configured as an electric vehicle (EV). More particularly, the vehicle 110 may include a battery EV (BEV) drive system. The vehicle 110 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 110 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Referring to FIG. 2, the vehicle 110 includes devices or sensors that are configured or programmed to generate signals that help identify a distance to an object or otherwise an occupancy status of a parking space.

The devices or sensors may include image sensors (e.g., cameras 240, 250) mounted to the vehicle 110 to achieve visual perception. Each camera generates sensor data by producing images 246, 256 of at least part of the environment around the vehicle 110. For purposes of clarity, a single camera is used for each direction 146, 148. However, combinations of cameras may be used and the sensor data from multiple cameras may be fused together into a view of the environment around the vehicle.

Cameras 240, 250 can be mounted to face in the direction the vehicle 110 is moving (e.g., forward or backwards). For purposes of teaching, the camera 240 (or a set of cameras) is a front-facing camera (e.g., a field of view in forward direction 146) and the camera 250 (or a set of cameras) is a rear-facing camera (e.g., a field of view in reverse direction 148).

The cameras 240, 250 each includes sensor components (e.g., a lens, an aperture, a shutter, a sensor plate, an IR emitter, an IR detector, etc.) and application-specific integrated circuit (ASIC). ASIC can include digital signal processing (DSP) functionality to perform various operations on image sensor data captured by sensor components.

Cameras 240, 250 can be similar types, or even the same type, of camera. Cameras 240, 250 have fields-of-view that can be similar and possibly even essentially the same. Within fields-of-view, cameras 240, 250 can respectively sense the parking environment 124 from the vehicle out to a certain distance threshold.

The cameras 240, 250 may be Red-Green-Blue/Infrared (RGB/IR) cameras that can generate images 246, 256 where each image section includes a Red pixel, a Green pixel, a Blue pixel, and an IR pixel. The RGB pixel intensities are used when there is sufficient light (e.g., during daytime). The intensity information from the IR pixels can be used during the night as well as in other low (or no) light environments to sense parking environment 124. Low (or no) light environments can include tunnels or other environments where natural light is obstructed.

Alternatively, cameras 240, 250 may include other sensor components (e.g., a lens, an aperture, a shutter, a sensor plate, a laser, a sensor for detecting laser reflections, etc.) and application-specific integrated circuit (ASIC). For example, camera 240, 250 may include a multipurpose time-of-flight (TOF) camera with a processing chip, such as, for example, a Red-Green-Blue-Infrared (RGB-TR) complementary metal-oxide semiconductor (CMOS) chip. Similar to LIDAR, the laser emits a pulse of IR wavelength. A processing chip (e.g., within ASIC) reads the time-of-flight information to process depth of objects (e.g., distances 176, 178). The processing chip can set appropriate IR pixel intensity information based on object depths. LIDAR mode and IR pixel intensity can be used during the night, in other low (or no) light environments, or when otherwise appropriate, to sense the parking environment 124.

The devices may also include sensors (e.g., sensor 260) such as a Radio Detection and Ranging (RADAR or "radar") sensor configured for detection and localization of objects using radio waves, a Light Detecting and Ranging (LiDAR or "lidar") sensor, ultrasonic sensors, an inertial measurement unit (IMU), a global positioning sensor (GPS), and other vision sensors for trajectory, obstacle detection, object classification, and the like. Using LIDAR sensors, objects can be tracked based on three-dimensional (3D) point clouds.

Data from each camera 240, 250 and the lidar sensor 260 may be provided to a central sensor perception chip 270 of a vehicle computer 272. Perception chip 270 can be a general or special purpose processing unit, such as for example, a Central Processing Unit (CPU), a Graphics Processing Unit (GPU), etc. Alternately or additionally, perception chip can include logic circuits, such as, for example, an ASIC or Field-Programmable Gate Array (FPGA). The perception algorithm runs on perception chip.

The central sensor perception chip 270 may use a sensor fusion or perception algorithm to fuse the data into a view of the parking environment 124 around the vehicle 110 or otherwise process the data for use in understanding and navigating the parking environment 124.

The perception algorithm may include a neural network architected in accordance with a multi-layer (or "deep") model. A multi-layer neural network model can include an input layer, a plurality of hidden layers, and an output layer. A multi-layer neural network model may also include a loss layer. The plurality of hidden layers can perform a number of non-linear transformations.

For classification of fused camera sensor data (e.g., an image), values in the sensor data (e.g., pixel-values) are assigned to input nodes and then fed through the plurality of hidden layers of the neural network.

From the view of the parking environment 124, the perception algorithm can process camera or sensor data to identify and classify objects of interest within parking environment 124. Object classifications can include: other vehicles, parking spaces or lines, signs, obstructions (e.g., shopping carts, pedestrians), etc. The perception algorithm can also determine the location of an object within parking environment 124, the distance to the object (e.g., distances 176, 178), and if the object is moving, a path of the object.

The vehicle computer 272 includes computer components including a memory (e.g., memory 274) and a processor (e.g., a processor 276 and/or the perception chip 270). A processor may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs).

A memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

Memory is computer readable media on which one or more sets of instructions, such as the software for performing the methods of the present disclosure, can be embedded. The instructions may embody one or more of the methods or logic as described herein. The instructions may reside completely, or at least partially, within any one or more of the memory, the computer readable medium, and/or within the processor during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

A VCU 300 includes a plurality of electronic control units (ECUs) 310 and is disposed in communication with the vehicle computer 272. The VCU 300 may coordinate the data between vehicle systems, connected servers, and other vehicles operating as part of a vehicle fleet. The VCU 300 may control aspects of the vehicle 110, and implement one or more instruction sets received from a vehicle system controller (such as vehicle computer 272) and/or received from a road side unit (RSU) 290.

The VCU 300 can include or communicate with any combination of the ECUs 310, such as, for example, a Body Control Module (BCM) 312, an Engine Control Module (ECM) 314, a Transmission Control Module (TCM) 316, the Telematics Control Unit (TCU) 318, a Restraint Control Module (RCM) 320, and the like. The TCU 318 may be disposed in communication with the ECUs 310 by way of a Controller Area Network (CAN) bus 340. In some aspects, the TCU 318 may retrieve data and send data as a CAN bus 340 node.

The CAN bus 340 may be configured as a multi-master serial bus standard for connecting two or more of the ECUs 310 as nodes using a message-based protocol that can be configured and/or programmed to allow the ECUs 310 to communicate with each other. The CAN bus 340 may be or include a high-speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 310 may communicate with a host computer (e.g., the vehicle computer 272, the RSU 290, and/or server(s), etc.), and may also communicate with one another without the necessity of a host computer.

The CAN bus 340 may connect the ECUs 310 with the vehicle computer 272 such that the vehicle computer 272 may retrieve information from, send information to, and otherwise interact with the ECUs 310 to perform steps described according to embodiments of the present disclosure. The CAN bus 340 may connect CAN bus nodes (e.g., the ECUs 310) to each other through a two-wire bus, which may be a twisted pair having a nominal characteristic impedance. The CAN bus 340 may also be accomplished using other communication protocol solutions, such as Media Oriented Systems Transport (MOST) or Ethernet. In other aspects, the CAN bus 340 may be a wireless intra-vehicle CAN bus.

The VCU 300 may control various loads directly via the CAN bus 340 communication or implement such control in conjunction with the BCM 312. The ECUs 310 described with respect to the VCU 300 are provided for exemplary purposes only, and are not intended to be limiting or exclusive. Control and/or communication with other control modules is possible, and such control is contemplated.

The ECUs 310 may control aspects of vehicle operation and communication using inputs from human drivers, inputs from a vehicle system controller, and/or via wireless signal inputs received via wireless channel(s) from other connected devices. The ECUs 310, when configured as nodes in the CAN bus 340, may each include a central processing unit (CPU), a CAN controller, and/or a transceiver.

The TCU 318 can be configured to provide vehicle connectivity to wireless computing systems onboard and offboard the vehicle 110 and is configurable for wireless communication between the vehicle 110 and other systems, computers, servers 116, RSUs 290, vehicles 112, 114, and modules.

For example, the TCU 318 includes a Navigation (NAV) system 330 for receiving and processing a GPS signal from a GPS 332, a Bluetooth© Low-Energy Module (BLEM) 334, a Wi-Fi transceiver, an Ultra-Wide Band (UWB) transceiver, and/or other wireless transceivers described in further detail below for using near field communication (NFC) protocols, Bluetooth© protocols, Wi-Fi, Ultra-Wide Band (UWB), and other possible data connection and sharing techniques.

The TCU 318 may include wireless transmission and communication hardware that may be disposed in communication with one or more transceivers associated with telecommunications towers and other wireless telecommunications infrastructure. For example, the BLEM 334 may be configured and/or programmed to receive messages from, and transmit messages to, one or more cellular towers associated with a telecommunication provider, and/or and a Telematics Service Delivery Network (SDN) associated with the vehicle 110 for coordinating vehicle fleet.

The BLEM 334 may establish wireless communication using Bluetooth© and Bluetooth Low-Energy communication protocols by broadcasting and/or listening for broadcasts of small advertising packets, and establishing connections with responsive devices that are configured according to embodiments described herein. For example, the BLEM 334 may include Generic Attribute Profile (GATT) device connectivity for client devices that respond to or initiate GATT commands and requests.

The RSU 290 and the TCU 318 may include radios configured to transmit (e.g., broadcast) and/or receive vehicle-to-everything (V2X) signals broadcast from another radio. Dedicated Short Range Communication (DSRC) is an implementation of a vehicle-to-everything (V2X) or a car-to-everything (CV2X) protocol. Any other suitable implementation of V2X/C2X may also be used. Other names are sometimes used, usually related to a Connected Vehicle program or the like.

The RSU 290 and the TCU 318 may include radio frequency (RF) hardware configured to transmit and/or receive signals, for example, using a 2.4/5.8 GHz frequency band.

Communication technologies described above, such as CV2X, may be combined with other technologies, such as Visual Light Communications (VLC), Cellular Communications, and short-range radar, facilitating the communication of position, speed, heading, relative position to other objects, and the exchange of information with other vehicles 112, 114, mobile devices, RSUs 290, or external computer systems 116.

External servers (e.g., servers 116) may be communicatively coupled with the vehicle 110 and the RSU 290 via one or more network(s) 118, which may communicate via one or more wireless channel(s) 350.

The RSU 290 may be connected via direct communication (e.g., channel 354) with the vehicle 110 using near field communication (NFC) protocols, Bluetooth© protocols, Wi-Fi, Ultra-Wide Band (UWB), and other possible data connection and sharing techniques.

The network(s) 118 illustrate example communication infrastructure in which the connected devices discussed in various embodiments of this disclosure may communicate. The network(s) 118 may be and/or include the Internet, a private network, public network or other configuration that operates using any one or more known communication protocols such as, for example, transmission control protocol/Internet protocol (TCP/IP), Bluetooth©, Wi-Fi based on the Institute of Electrical and Electronics Engineers (IEEE)

standard 802.11, WiMAX (IEEE 802.16m), Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), Universal Mobile Telecommunications System (UMTS), Long Term Evolution (LTE), and the like.

The NAV system 330 may be configured and/or programmed to determine the vehicle location. The NAV system 330 may include a Global Positioning System (GPS) receiver configured or programmed to triangulate the vehicle location relative to satellites or terrestrial based transmitter towers associated with the GPS 332. The NAV system 330 may determine and share the vehicle location and receive locations such as the location of the other vehicles in the parking environment 124. The NAV system 330 may store in memory fixed locations such as the locations of parking spaces in the parking environment 124.

The NAV system 330 may be further configured or programmed to develop routes from a current vehicle location to a selected destination, display a map and present directions to the selected destination, and determine an estimated time to travel to the selected location and a predicted time of arrival. The estimated time of arrival may be based on the position, speed, and heading or other vehicle information determined by the NAV system 330. The NAV system 330 may work with autonomous driving systems to move the vehicle 110 to a location.

The BCM 312 generally includes an integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 312 may also operate as a gateway for bus and network interfaces to interact with remote ECUs.

The BCM 312 may be configured for vehicle energy management, exterior lighting control, wiper functionality, power window and door functionality, heating ventilation and air conditioning systems, and driver integration systems. In other aspects, the BCM 312 may control auxiliary equipment functionality, and/or is responsible for integration of such functionality. In one aspect, a vehicle having a vehicle control system may integrate the system using, at least in part, the BCM 312.

The BCM 312 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc.

Referring to FIG. 1, the server 116 includes the database 120 of parking environment data 122 that can be used to facilitate locating an unoccupied parking space or an area 164 where parking spaces have a high probability of being unoccupied. The server 116 receives parking environment data 122, generates parking environment data 122, and updates the database 120 based on the parking environment data 122.

The parking environment data 122 represents a parking environment 124 (e.g., one or more areas 164) including the locations 140, 142, 144 of parking spaces 130, 132, 134, the occupancy status 150, 152, 154 (e.g., "X" symbol 150, 152 represents an occupied status and "checkmark" symbol 154 represents an unoccupied status) of parking spaces 130, 132, 134, a time associated with the occupancy status 150, 152, 154, the predicted availability 160 of the parking spaces (e.g., a percentage of time that a parking space is unoccupied during a part of the day based on historical occupancy status of the parking spaces), a predicted availability 162 for an area 164, and the like. The database 120 may also include objects (e.g., trailers, generators, storage containers, etc.) that are permanent or not predicted to move and the locations of such objects.

The parking environment data 122 may further include a designation or indication that a parking space is restricted or limited for at least certain days and times. For example, a parking space may be designated for handicapped individuals, for loading/unloading, for permit only (e.g., local residents), as fire lane, combinations thereof, and the like. Availability of a parking space may be limited to certain hours to allow for street cleaning, street closures (e.g., for repairs), to provide parking for businesses during the day or business hours, combinations thereof, and the like.

The parking environment data 122 may include data received from sensors, data generated from the data received from sensors, and data from other systems or sources such as parking meters and parking regulations set by the city government.

For each parking space, the server 116 tracks the occupancy status 150, 152, 154 over time and calculates a predicted availability 160 for each parking space 190. A predicted availability 160 may be calculated for each day of the week and for time increments during each day. For example, the predicted availability 160 for parking space 130 at Wednesday from 1 pm to 1:30 pm may use the historical occupancy status 150 as measured on Wednesdays at times in the time period of 1 pm to 1:30 pm. As shown for parking spaces 190 in area 164, the predicted availability 160 may be presented as a percentage of time that the parking space 190 is unoccupied.

FIG. 1 schematically illustrates the database 120 as including predicted availability 160 for parking spaces 190 in an area 164 (e.g., a street). Parking spaces 190 with a predicted availability 160 above a certain threshold (e.g., 50%) may be highlighted.

The server 116 calculates a predicted availability 162 for areas 164. For example, the predicted availability 162 may be based on a number of parking spaces 190 in the area 164 with a predicted availability 160 above a certain threshold. Areas 164 may be highlighted on a map based on their predicted availability 162 to facilitate comparing areas and discovering areas where parking is available.

Figure 3:
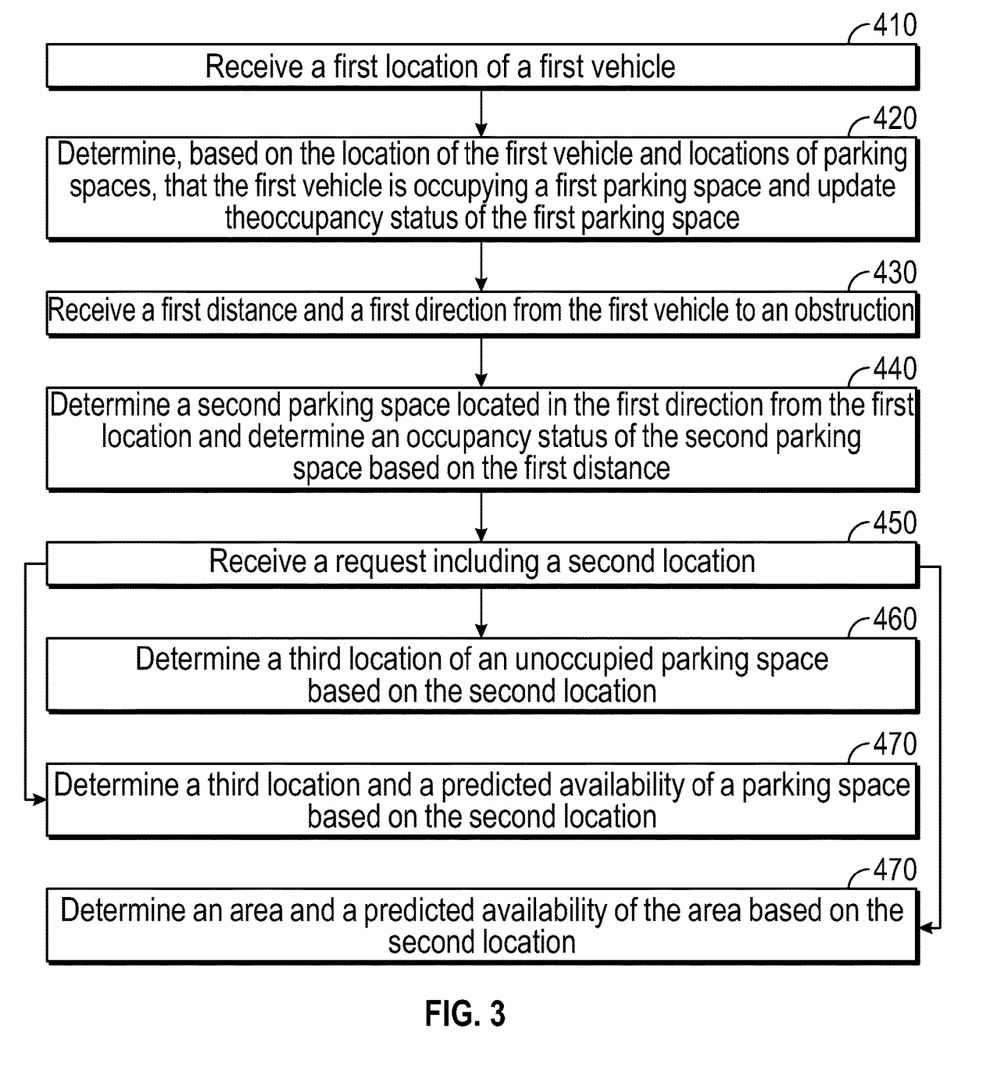
FIG. 3 depicts a method of locating a parking space in accordance with the present disclosure.

Referring to FIG. 3, according to a first step 410 of an exemplary method 400, the server 116 receives parking environment data 122 from a vehicle 110 including the location 170 of the vehicle 110. The vehicle 110 may determine its location 170 and send the location 170 to the server 116 via the network 118.

According to a second step 420, the server 116 may determine, based on the location 170, that the vehicle 110 is occupying a parking space 130 and update the database 120 for the parking space 130 (e.g., change the occupancy status 150 to occupied) including the time of the update. The server 116 may compare the location 170 of the vehicle 110 to the locations 140, 142, 144 of parking spaces and identify a parking space 130 where the smallest difference is found between location 170 of the vehicle 110 and the location 140 of the parking space 130.

According to a third step 430, the vehicle 110 may determine a distance 176, 178 to an object or obstruction in each of the forward direction 146 and the reverse direction 148. The vehicle 110 may send the distances 176, 178 and directions 146, 148 relative to its location 170 to the server 116.

According to a fourth step 440, the server 116 may determine the occupancy status 152, 154 of parking spaces 132, 134 based on the distances 176, 178 and directions 146, 148 relative to the location 170 of the vehicle 110. The server 116 may determine parking spaces 132, 134 that are adjacent to the location 170 based on the locations 142, 144 of the parking spaces 132, 134 and the location 170 and directions 146, 148. For example, location 144 is closest to the location 170 in the forward direction 146 and location 142 is closest to the location 170 in the reverse direction 148.

The server may determine next closest parking spaces in each direction, and then next closest parking spaces in each direction, and so on.

For each direction 146, 148, the associated distance 176, 178 indicates if and how many of the spaces are unoccupied in that direction. For example, server 116 determines that the parking space 134 is unoccupied because forward distance 176 in the forward direction 146 is greater than a length of the parking space 134; and the server 116 updates the occupancy status 154 to reflect that parking space 134 is unoccupied. If there is an additional parking space in the forward direction 146 from parking space 134, that parking space may be updated to an occupancy status 154 of occupied.

The server 116 determines that the parking space 132 is occupied because reverse distance 178 in the reverse direction 148 is less than a length of the parking space 132; and the server 116 updates the occupancy status 152 to reflect that the parking space 132 is occupied.

In general, the distance may be divided by the length of a parking space (e.g., the distance between locations of adjacent parking spaces) and the integer of the result is the number of unoccupied parking spaces. Similarly, for two parking spaces, the distance may be divided by the distance between the two parking spaces and if the integer of the result is one then the parking space is unoccupied and if the integer of the result is zero then the parking space is unoccupied.

According to a fifth step 450, the server 116 receives a request from a vehicle 114 to find an unoccupied parking space or area. The request 180 may include a destination location or a location 182 of the vehicle 114, each of which may represent a location or area where the vehicle 114 wants to park. For purposes of teaching, vehicle location 182 will be used to further describe an exemplary method.

According to a sixth step 460, based on the request 180, the server 116 may determine one or more unoccupied parking spaces in a parking environment 124 (e.g., a designated area 164) that includes the vehicle location 182. The parking environment 124 or area 164 may be a predefined area or may be determined according to a threshold distance from the vehicle location 182. The parking spaces in the parking environment 124 or area provide an initial set of parking spaces 130, 132, 134. In the case of a threshold distance from the vehicle location 182, the server 116 may compare the vehicle location 182 to the locations 140, 142, 144 of parking spaces 130, 132, 134 to determine an initial set of parking spaces.

The server 116 may then determine which of the set of parking spaces 130, 132, 134 have an occupancy status 150, 152, 154 that is unoccupied. In FIG. 1, the server 116 may select the parking space 134 as that which is closest to the vehicle location 182 and which has an occupancy status 154 that is unoccupied.

The server 116 may provide the location 144 of the parking space 134 to the vehicle 114, which may then generate directions 184 to the location 144 of the parking space 134.

More generally, the server 116 may generate a set or list of unoccupied parking spaces ranked according to shortest distance to the vehicle location 182 and provide the location of the closest unoccupied parking space. The server 116 may also determine a location of an area with a high density of unoccupied parking spaces.

The server 116 may update the list of unoccupied parking spaces (e.g., add or remove parking spaces) as the status of the parking spaces change over time (e.g., before the vehicle 114 arrives at the parking space 134). The server 116 may provide a next best parking space until the vehicle is parked in an unoccupied space.

The vehicle 114 may display locations of unoccupied parking spaces on a digital map (e.g., as is represented by area 164) that is provided on a display of the vehicle 114. The server 116 may update the map (e.g., add or remove highlighting from parking spaces) as the status of the parking spaces change over time.

According to an seventh step 470, if at the fifth step 450 the occupancy status 150, 152, 154 of a parking space is unknown, the server 116 may provide the locations and the predicted availability 160 of parking spaces 190 in the parking environment 124 or area 164 to facilitate finding an unoccupied parking space. For example, the occupancy status of a parking space may be unknown if recent measurements are not available.

The vehicle 114 may display the locations of parking spaces 190 and their predicted availability 160 on a digital map (e.g., as shown for area 164) that is provided on a display of the vehicle 114.

According to an eighth step 480, if at fifth step 450 the occupancy status 150, 152, 154 of a parking space is unknown, the server 116 may provide a location and predicted availability 162 for an area 164. For example, the predicted availability 162 of the area 164 may be the average of the predicted availability 160 of parking spaces 190 in the area 164, the highest predicted availability 160 of the parking spaces 190 in the area 164, or a density (e.g., the number of parking spaces 190 with a predicted availability 160 above a certain threshold).

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A system, comprising:
   a processor; and
   a memory, comprising:
      parking environment data including a plurality of parking spaces, a location of each of the plurality of parking spaces, and an occupancy status of at least one of the plurality of parking spaces; and
      computer executable instructions that, when executed by the processor, cause the processor to:
         receive, from a first vehicle, a first location of the first vehicle, a first direction, and a first distance in the first direction;
         determine a first parking space of the plurality of parking spaces based on the first location and the first direction;
         determine the occupancy status of the first parking space based on the first distance in the first direction;
         determine, based on a location received from a second vehicle, a predicted availability of a parking space; and
         transmit a location of the parking space and the predicted availability to the second vehicle,
      wherein the predicted availability is a percentage of time that a parking space is unoccupied based on a historical occupancy status of the parking space.

2. The system of claim 1, wherein the occupancy status of the first parking space is determined to be occupied if the first distance is less than a length of a parking space.

3. The system of claim 1, wherein the occupancy status of the first parking space is determined to be unoccupied if the first distance is greater than a length of a parking space.

4. The system of claim 1, comprising computer executable instructions that, when executed by the processor, cause the processor to:
   determine a second parking space of the plurality of parking spaces based on the first location and the first direction, wherein the first parking space is between the second parking space and the first location; and
   determine the occupancy status of the second parking space based on the first distance in the first direction.

5. The system of claim 4, wherein the occupancy status of the second parking space is determined to be occupied if the first distance is greater than a length of a parking space and less than two lengths of a parking space.

6. The system of claim 4, wherein the occupancy status of the second parking space is determined to be unoccupied if the first distance is greater than two lengths of a parking space.

7. The system of claim 1, comprising computer executable instructions that, when executed by the processor, cause the processor to:
   determine a second parking space at the first location of the first vehicle; and
   update the occupancy status of the second parking space to be occupied.

8. The system of claim 1, wherein the first direction is one of a forward direction and a reverse direction of the first vehicle.

9. The system of claim 1, comprising computer executable instructions that, when executed by the processor, cause the processor to:
   receive, from the first vehicle, a second direction and a second distance in the second direction;
   determine a second parking space of the plurality of parking spaces based on the first location and the second direction; and
   determine the occupancy status of the second parking space based on the second distance in the second direction.

10. The system of claim 9, wherein the first direction is one of a forward direction and a reverse direction of the first vehicle and the second direction is the other of the forward direction and the reverse direction.

* * * * *